Dec. 15, 1931.   K. SCHADE ET AL   1,836,992
CONTROL SYSTEM
Filed March 19, 1927   2 Sheets-Sheet 1

WITNESSES:
E. A. McClatkey
J. E. Dickinson

INVENTORS
Karl Schade
& Herbert Hochreuter
BY
Wesley S. Carr
ATTORNEY

Dec. 15, 1931.    K. SCHADE ET AL    1,836,992
CONTROL SYSTEM
Filed March 19, 1927    2 Sheets-Sheet 2

WITNESSES:
E.A. McCloskey
J.E. Dickinson

INVENTORS
Karl Schade
& Herbert Hochreuter
BY
Charles J. Carr
ATTORNEY

Patented Dec. 15, 1931

1,836,992

UNITED STATES PATENT OFFICE

KARL SCHADE, OF BERLIN-WILMERSDORF, AND HERBERT HOCHREUTER, OF BERLIN-SIEMENSSTADT, GERMANY, ASSIGNORS TO WESTINGHOUSE ELECTRIC AND MANUFACTURING COMPANY, A CORPORATION OF PENNSYLVANIA

CONTROL SYSTEM

Application filed March 19, 1927, Serial No. 176,819, and in Germany April 9, 1926.

Our invention relates to systems of motor control and it has special reference to such systems as are adapted for use with electric hoists.

In systems in which the Ward Leonard control is employed, the speed of the motor corresponds, in general, to the position of the control lever, but the correspondence is different for different loads. These conditions are caused by the different armature reactions of the machines in the Ward Leonard circuit, the remanence of the iron in the magnetic circuits and the voltage drop in the resistors.

In cases where great precision is demanded, special precision devices must be used, but those used heretofore have required special auxiliary windings in the control generator. Such auxiliary windings cannot be provided on machines already installed, as it is usually impossible to place the windings on such machines.

One of the objects of our invention is to provide a system employing Ward Leonard control using a precision connection in which the desired speed is regulated by the control means and automatically compared with the actual speed of the motor.

A second object of our invention is to provide a system of the above-described character using two electrodynamic forces for the correct effect on the actual speed of the motor, these forces being respectively determined by a voltage proportional to the motor speed and by a voltage proportional to the position of a control brush.

A further object of our invention is to provide a system of the class set forth which may easily be adapted to any Ward Leonard control system in which great precision is demanded.

Further objects of our invention will become evident from the following detailed description, taken in conjunction with the accompanying drawings, wherein.

Figure 1:
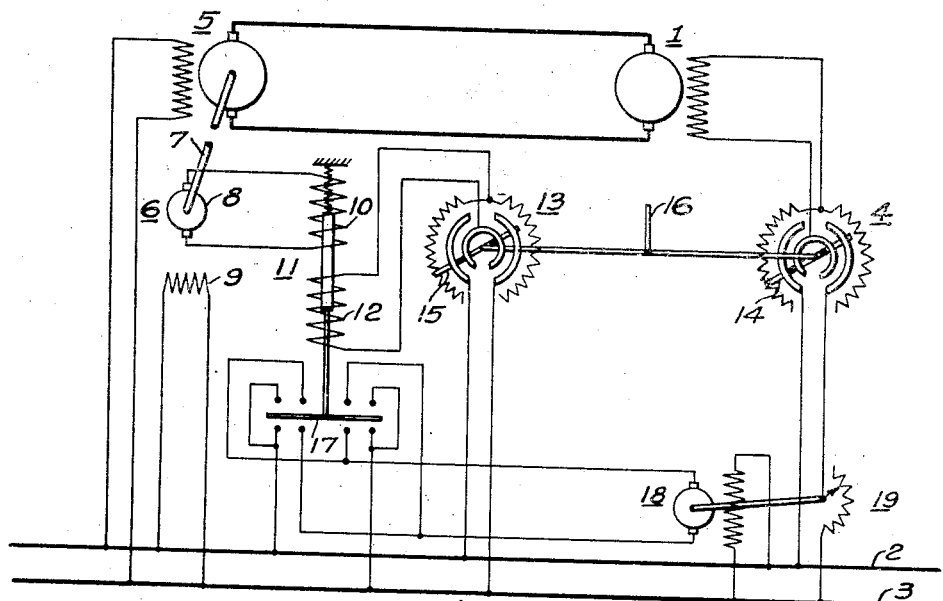
Fig. 1 is a diagrammatic view of a system illustrating one embodiment of our invention.

Referring to Fig. 1, the excitation of the control generator 1 of the Ward Leonard circuit is derived from line conductors 2 and 3 through a variable resistor or control means 4. The driven motor 5 is connected to generator 1 in the usual manner, and a tachometer generator 6 is coupled to the motor 5 by some suitable means, such as a shaft 7. The voltage of the armature 8 of the generator 6 varies in accordance with the speed of the motor 5, inasmuch as it is coupled thereto and has a constant-strength separately exicted field winding 9 which may be connected to the line conductors 2 and 3. The generator armature 8 energizes a coil 10 of a differential relay 11, the second coil 12 of which is energized through an auxiliary control device or variable resistor 13 from the line conductors 2 and 3.

In the system shown, the control device 4 is mechanically coupled with the auxiliary control device 13, so that their respective brushes 14 and 15 are moved symmetrically when control lever 16 is actuated. The contact members 17 of the differential relay controls an auxiliary motor 18 which serves to adjust the variable resistor or regulator 19 connected in series relation with the controller 4.

The operation of the system is as follows:

When the control lever 16 is moved from its zero or neutral position it will initiate the excitation of the control generator 1, and the voltage thereby applied to the motor 5 starts it into operation. The actual speed of this motor lags somewhat behind that for which the control apparatus has been adjusted. However, an exact measure of this desired speed has been simultaneously provided by the auxiliary control device 13 for the coil 12 of the differential relay 11. As the adjusted voltage of the coil 12 which corresponds to the desired speed at first exceeds the voltage generated by the tachometer generator 6 applied to the coil 10, the bridging member 17 will move downwardly and connect the auxiliary motor 18 in a manner to operate in such direction that the regulator 19 will permit a greater excitation in the field winding of the control generator 1.

This process continues until the actual speed of motor 5 has reached the desired value, after which the differential relay will move into its intermediate position. If the actual speed should increase, the voltage on the coil 10 would increase to such an extent as to cause the differential relay to move its core and its bridging member 17 upwardly, whereby the regulator 19 would be adjusted in the opposite direction. The control motor 18 is arranged to operate within comparatively narrow speed limits, as the regulator 19 has to take care of only relatively small variations.

The connections, according to the present invention, may also be so arranged that the auxiliary control device 13 will be adjusted independently of the main control device 4, either manually or automatically, by suitable controlling means, the main control device being actuated by a control motor which is regulated in accordance with the difference between the actual and the desired speed.

Figure 2:
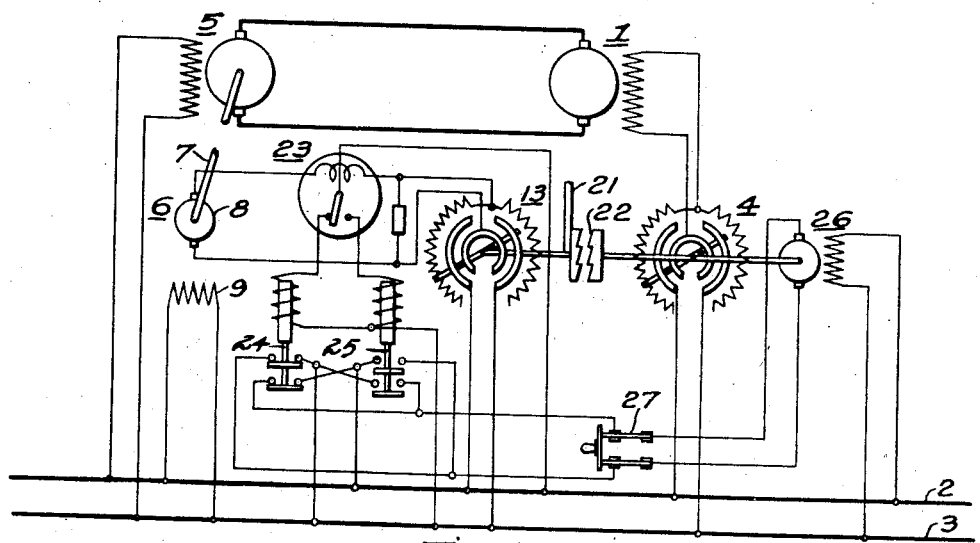
Fig. 2 is a diagrammatic view of a similar system employing a polarized relay and separately actuated control levers.

Referring to Fig. 2, a system having the above-described characteristics is illustrated, and the corresponding elements are numbered as in Fig. 1. The auxiliary control device 13 is not directly connected to the main control device 4. But, by use of a clutch 22, it may be so connected and adjusted automatically, as well as manually, by means of the control lever 21 or other similar means.

A polarized relay 23 is arranged to be responsive to the voltage delivered thereto by the controller 13 and the tachometer generator. This relay governs the operation of the switching means 24 and 25 which controls auxiliary motor 26 for actuating the main control device 4.

The control lever 21 may be coupled, through clutch 22, for direct control of the auxiliary device 13, but if, for any reason, an indirect control is desired, it may be disconnected, as in Fig. 2, from the auxiliary control device 13 and be connected to the main control device 4. The precision connection may be made ineffective in this case by opening a control-motor switch 27, in which case, the machine 5 is controlled in the usual manner.

The arrangement for indirect control operates in the following manner. The movement of the control lever 21 causes a predetermined desired voltage to be obtainable from the auxiliary control device 13 for energizing the polarized relay 23. This relay governs the actuation of the one or the other of the differential contactors 24 and 25 so that the auxiliary motor 26 will start and move the control device 4 in the desired direction.

When the motor 5 has reached the desired speed, relay 23 returns to an intermediate position to effect disconnection of the auxiliary motor 26. If a speed in excess of the desired speed is attained, the relay 23 will so actuate the other differential contactor that the auxiliary motor 26 will operate in the reverse direction to actuate the control device 4 to reduce the exciting voltage of generator 1.

When the control lever 21 is turned to the zero position, the voltage corresponding to the desired speed disappears from the polarized relay, and the relay is energized only by the voltage of the tachometer generator 6, so that the auxiliary motor 26 is energized to operate in the reverse direction and return the control device 4 to its zero position. The speed at which the control device 4 is moved; that is, the acceleration or retardation of the machine, is determined, once for all, by the speed of the auxiliary motor 26 and the transmission ratio selected. Instead of the polarized relay, an ordinary differential relay, as shown in Fig. 1, may be employed. Such a change, however, requires a direction-reversing means, preferably in the form of a quick-break switch in the armature circuit of the auxiliary motor, to be reversed by the control lever whenever it reaches its zero position. However, in the case of hoist installations of certain types, a connection of this description can not be ordinarily used. The polarized relay has the advantage that the armature current of the auxiliary motor need not be reversed, as the polarized relay responds not only to the value of the voltage but also to its direction.

According to the present invention, a constant desired voltage may be used instead of an adjustable voltage, as provided by the auxiliary control apparatus 13, in the system shown in Fig. 1 and Fig. 2.

Figure 3:
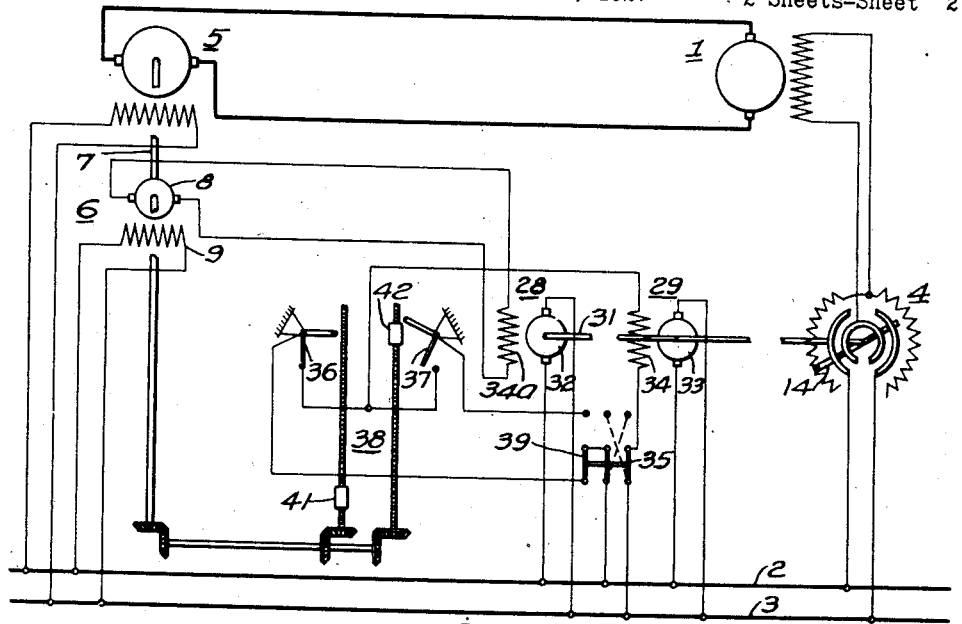
Fig. 3 is a diagrammatic view of another embodiment of our invention in which a constant voltage may be utilized in place of an adjustable voltage.

Referring to Fig. 3, a system is shown in which two electric motors 28 and 29 are employed in place of a differential relay, both motors being mounted on the same shaft 31 for actuating the control device 4. The armatures 32 and 33 of these motors are continuously energized from the supply conductors 2 and 3. Field winding 34 of the motor 29 is energized by an adjustable voltage, in the one or the other direction, in accordance with the position of a reversing switch 35. The field circuit is further closed through limit switches 36 and 37 on a depth-indicator mechanism 38 of well-known construction and through a short-circuiting switch or contact member 39 on the reversing switch 35. The field winding 34a of the second motor 28 is energized by the tachometer generator 6 in a manner tending to cause the armature of motor 28 to rotate in a direction opposite to that of motor 29.

The system operates as follows: The reversing switch 35 is placed in the illustrated position at the beginning of the hoisting operation. The field winding of the motor 29 is then energized through contact member 36 on the depth indicator 38 and contact member 39 of the reversing switch 35. The motor 29 will then operate in a certain direction to adjust the brushes of control device 4 for the desired direction of travel. The voltage generated by the tachometer generator 6 will increase in proportion to the increase in the speed of the main motor 5. The motor 28 will tend to turn at the same speed and in a direction opposite to the motor 29, thereby retarding the same. The brushes 14 of the control device 4 will, therefore, be moved more and more slowly and will become stationary when the two motors 28 and 29 are in equilibrium. The deceleration curve does not, therefore, follow a straight line, but is of an arcuate shape, somewhat like a parabola.

Near the end of the hoisting operation, an upwardly travelling nut 41 on the depth indicator 38 engages contact member 36, whereby the circuit of the motor 29 is interrupted. The motor 28, which is still fully energized by the tachometer generator 6, will then be operated to return the brushes of the control device 4 to their zero positions. To start the next operation, corresponding to the reverse direction of travel, it is sufficient to actuate the reversing switch 35 to its other position, either manually or automatically or by remote control means, whereupon the operation will continue in the reverse direction until travelling nut 42 engages and opens the contact member 37, as illustrated.

Figure 4:
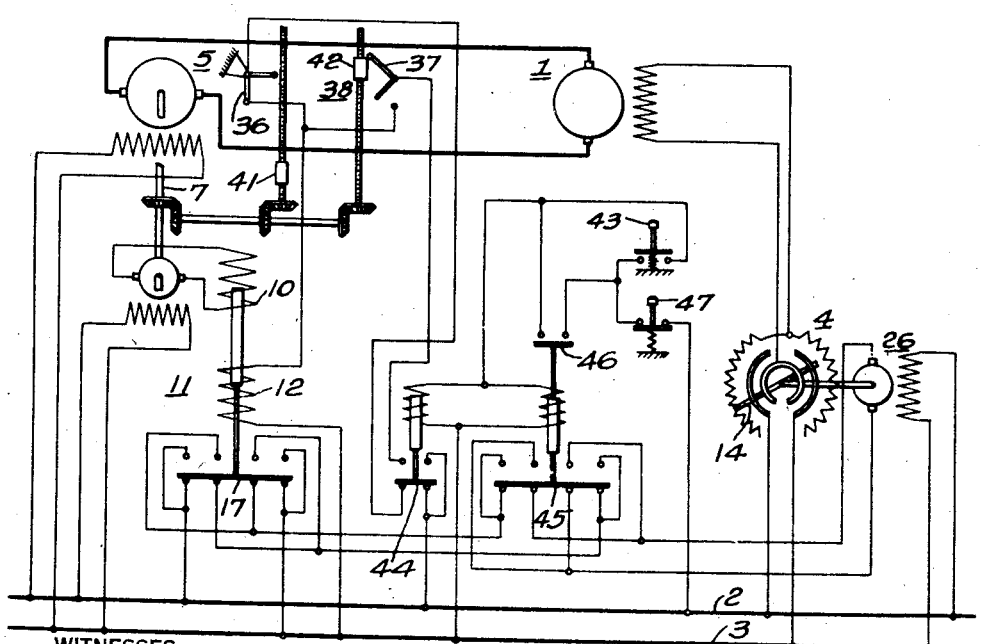
Fig. 4 is a diagrammatic view of a system similar to that shown in Fig. 3 in which means are provided for semi-automatic control.

Referring to Fig. 4, a system is illustrated for semi-automatic control. A push-button control here serves to start the machine in the one or the other direction by means of the main control device 4 and auxiliary motor 26. Push-button switch 47 is normally closed, and, when push-button switch 43 is also closed, corresponding to one direction of travel, two control contactors 44 and 45 are energized from supply conductors 2 and 3.

The contactor 44 serves to determine which of the limits switches 36 and 37 on the depth indicator 38 will be placed in circuit relation with coil 12 of the differential relay 11 in connecting that coil to some constant-voltage source, such as the supply conductors 2 and 3. When the contactor 44 is energized, limit switch 36 is excluded from the circuit mentioned above and, when it is deenergized or in its lower position, limit switch 37 is disconnected from the circuit.

The contactor 45 serves to reverse the rotation of auxiliary motor 26 and is provided with a holding contact member 46 which maintains the circuit for both contactors 44 and 45 after the push-button 43 has been released.

The starting operation is substantially the same as hereinbefore described for the other systems. Shortly before the end of the hoisting or lowering operation, the coil 12 of the differential relay is deenergized by its cooperating limit switch, 36 or 37, and the auxiliary motor 26 returns the control device 4 to its zero position, whereby the motor 5 is stopped. Push-button 47 serves to initiate the operation of motor 5 in the other direction. This push-button interrupts the holding circuit for the control contactors 44 and 45, so that they drop to the illustrated positions and start the next operation. An interlock may be provided for the two push-buttons which will permit their actuation only in case the machines are stationary.

The control members for connecting and reversing the motor may be made fully automatic in accordance with the invention and effected by a timing motor or in dependence upon predetermined operating conditions of the motor, or of the whole installation.

Although we have shown our invention in several practical or preferred forms, further modifications in the system and arrangement of parts may be made without departing from the spirit and scope of our invention, and such modifications are intended to be covered by the appended claims.

We claim as our invention:

1. In a system of motor control, the combination with a generator, of a source of current therefor and a motor driven thereby, a variable resistor connected between said generator and the source of current for controlling the excitation of said generator, a tachometer generator mechanically connected to said motor for producing a voltage in accordance with the speed of said motor, a polarized relay, a second variable resistor arranged to connect said relay to said source, means for mechanically connecting said resistors together, said relay being responsive also to the voltage produced by said tachometer generator, and a control motor coupled to said first-mentioned resistor, said motor being controlled by said relay.

2. In a motor-control system, in combination, a motor, a generator provided with a field winding for supplying variable-voltage power to the motor, a source of power for exciting the motor and generator, a manually-operable rheostate for directly controlling the excitation current flowing in the generator field winding to preselect a desired motor speed, a tachometer generator driven by the motor disposed to develop a voltage in accordance with the actual speed of the motor, and means operable to further control the operation of the rheostat, said means being differentially responsive to the voltage of the tachometer generator and a predetermined voltage from the power source proportional to the desired speed of the motor, whereby the voltage applied to the motor is automatically regulated to cause it to operate at the desired speed.

3. In a motor-control system, in combination, a motor, a generator for supplying variable-voltage power to the motor, a source of power for exciting the motor and generator, a main rheostat for controlling the excitation of the generator to vary the motor speed, a tachometer generator actuated in accordance with the speed of the motor for producing a voltage proportional to the actual speed of the motor, an auxiliary rheostat connected to the power source operable to produce a voltage proportional to the desired motor speed as determined by the main rheostat, means interposed between the main and auxiliary rheostats for effecting their simultaneous operation, said means being disposed to permit the release of the main rheostat from the auxiliary rheostat, a motor for actuating the main rheostat, and means differentially responsive to the voltages of the tachometer generator and the auxiliary rheostat for controlling the operation of said rheostat-actuating motor, thereby to cause the actual motor speed to be the same as the desired speed.

4. In a motor-control system, in combination, a motor, a generator for supplying variable-voltage power to the motor, a source of power for exciting the motor and generator, a main rheostat for controlling the excitation of the generator to select a desired motor speed, an auxiliary rheostat connected to the power source disposed to function as an auxiliary voltage supply, mechanical means for actuating said main and auxiliary rheostats in unison whereby the voltage supplied by the auxiliary rheostat is varied in proportion to the excitation voltage of the generator, said mechanical means being disposed to permit further independent movement of the main rheostat, a tachometer generator actuated by the motor to produce a voltage proportional to the actual speed of the motor, and means differentially responsive to the voltages of the auxiliary rheostat and the tachometer generator for effecting a further adjustment of the main rheostat to change the initial voltage of the generator thereby to automatically maintain any desired motor speed regardless of changes occurring in the motor load.

In testimony whereof, we have hereunto subscribed our names this 12th day of February, 1927.

KARL SCHADE.
HERBERT HOCHREUTER.